United States Patent [19]
Wleklinski et al.

[11] Patent Number: 5,161,671
[45] Date of Patent: Nov. 10, 1992

[54] TRANSFER STATION FOR TRANSFERRING MATERIAL BETWEEN CONVEYORS IN A MINE WORKING

[75] Inventors: Bernhard Wleklinski, Werne; Manfred Senft, Dortmund; Norbert Hesse, Lunen, all of Fed. Rep. of Germany

[73] Assignee: Westfalia Becorit Industrietechnik, GmbH, Fed. Rep. of Germany

[21] Appl. No.: 797,699

[22] Filed: Nov. 25, 1991

[30] Foreign Application Priority Data

Nov. 30, 1990 [DE] Fed. Rep. of Germany ....... 4038228

[51] Int. Cl.⁵ .............................................. B65G 15/24
[52] U.S. Cl. ...................................., 198/606; 198/605
[58] Field of Search ............... 198/599, 561, 605, 606, 198/607

[56] References Cited

U.S. PATENT DOCUMENTS

| | | | |
|---|---|---|---|
| 4,673,079 | 6/1987 | Grundken et al. | 198/606 X |
| 4,766,992 | 8/1988 | Braun et al. | 198/606 X |

FOREIGN PATENT DOCUMENTS

| | | | |
|---|---|---|---|
| 2237976 | 2/1974 | Fed. Rep. of Germany | 198/606 |
| 2659855 | 8/1977 | Fed. Rep. of Germany | 198/606 |
| 2035247 | 6/1980 | United Kingdom | 198/606 |

Primary Examiner—Robert P. Olszewski
Assistant Examiner—James R. Bidwell
Attorney, Agent, or Firm—Samuels, Gauthier & Stevens

[57] ABSTRACT

A transfer station for transfer of material from a longwall face to the gate or roadway employs a box frame uniting a scraper-chain face conveyor with a scraper-chain gate or roadway conveyor. An opening in the tray of the face conveyor inside the box frame allows material to pass from the top run of the face conveyor to the top run of the gate conveyor. A plate like pivotal supporting element is mounted so as to be adjustable from a stowage position into a set out position and vice versa. In the set out position the support element bridges over the opening in the tray and therefore prevents a collision between the scraper-chain assemblies of the face and gate conveyors during the return of the face conveyor.

9 Claims, 3 Drawing Sheets

TRANSFER STATION FOR TRANSFERRING MATERIAL BETWEEN CONVEYORS IN A MINE WORKING

FIELD OF THE INVENTION

The present invention relates to a transfer station for use in underground mines where material is transferred from a scraper-chain face conveyor to a scraper-chain gate or roadway conveyor.

As is known, scraper-chain conveyors are constructed from channel sections or pans disposed end-to-end and each composed of a floor plate or tray extending between profiled side walls. A scraper-chain assembly is circulated along the pans in upper and lower runs above and below the floor plates.

BACKGROUND TO THE INVENTION

In known transfer stations, machine frames of the face conveyor and of the gate conveyor extending at right angles thereto are constructionally combined to form a box frame. The individual runs of the face conveyor and of the gate conveyor are then arranged so as to intersect alternately inside the box frame, with the upper or top run of the gate conveyor located between the upper or top run and the lower or bottom run of the face conveyor, in such a way that the material is discharged, optionally with the assistance of a fender, from the top run of the face conveyor through an opening in its floor or tray into the top run of the gate conveyor located directly below it. Any fines which are entrained by the scraper chain assembly of the face conveyor passing over the opening in its tray are conveyed on to the deflection and driving drum of the face conveyor and thence back into the bottom run thereof. From the bottom run of the face conveyor the fines are dumped via an opening in the tray of the bottom run into the closed bottom run of the gate conveyor so that they are conveyed upwardly to the top run of the gate conveyor and are carried off therein together with the remaining material.

To achieve uninterrupted transfer of material from the face conveyor into the gate conveyor at the box frame, the opening in the conveyor tray of the face conveyor in the base frame is extended as far as possible over the complete width of the tray and over a specific length and at least one lateral wall profile, which serves to guide the scraper-chain assembly in the top run of the face conveyor, is removed in the region of the opening in the tray (see U.S. Pat. No. 4,673,079). As the scraper-chain assemblies of the face and gate conveyor are tensioned in the top run during the normal conveying operation, they cannot collide in the region where they pass through the box frame even if the scraper-chain assembly of the face conveyor passes through the region of the opening in the tray without guidance on both sides. During the return of the face conveyor, for example for transportation of material or for cleaning purposes and the like, however, slack chain may form in the top run of the face conveyor inside the box frame so there is a risk that the scraper-chain assembly of the face conveyor not guided in the region of the opening in the tray will collide with the scraper-chain assembly of the gate conveyor located therebelow.

To overcome this problem, it is known with transfer stations having the box frame as mentioned to arrange narrow support elements in the form of rods in the region of the opening in the tray to guide and support the scraper-chain assembly of the face conveyor. These support elements bridge over the tray opening in the box frame and are equipped with horn-like guide elements for the scraper-chain assembly (see DE-PS 26 00 999). These support elements are arranged rigidly in the box frame and during the normal conveying operation, the support elements are subjected to not inconsiderable wear. The support elements also constrict the discharge cross section of the tray opening of the face conveyor located in the box frame and this can obstruct the transfer of material.

It is also known with transfer stations with box frames as mentioned to remove part of the conveyor tray of the face conveyor inside the box frame only over part of its width so that the scraper-chain assembly of the face conveyor also rests on the remaining part of the conveyor tray as it passes through the box frame (see U.S. Pat. No. 4,766,992). A relatively narrow tray opening is produced in this case and this also hinders the transfer of material.

It is an object of the invention to design an improved transfer station such that excessive wear of means for supporting the scraper-chain assembly as it passes over the tray opening is prevented, the opening in the tray of top run of the face conveyor is as large as possible for uninterrupted transfer of material and collisions of the scraper-chain assemblies of face conveyor and gate conveyor with the formation of slack chain, which can appear during the return of the face conveyor, are avoided.

SUMMARY OF THE INVENTION

According to the invention, there is provided a transfer station for the transfer of material from a longwall face to a gate or roadway in an underground mine; said station comprising at least part of a scraper-chain face conveyor for transferring material along the longwall face, at least part of a scraper-chain gate conveyor for taking material from the face conveyor and transferring the material away from the longwall face, a box frame in which a top run of the gate conveyor is arranged between a top run and a bottom run of the face conveyor, an opening in the face conveyor between the top run of the face conveyor and the top run of the gate conveyor and supporting means locatable beneath a scraper-chain assembly of the face conveyor in the region of the opening thereof to support the assembly. In accordance with the invention, the support means is adjustable from a stowage position which is ineffective for supporting the scraper-chain assembly into an operative position for supporting the scraper chain assembly and vice versa.

Owing to the adjustable nature of the support means it is possible to bring the support means into the working or set out position only when there is a risk of a collision of the scraper-chain assembly in the box frame due to the formation of slack chain, for example during the return of the face conveyor. During the normal conveying operation, when slack chain cannot be formed in the top run of the face conveyor, the support means can be located in the reset or stowage position so that it is not run over by the scraper-chain assembly of the face conveyor and consequently is not subjected to wear and does not obstruct the transfer of material or debris from the top run of the face conveyor into the top run of the gate conveyor.

The adjustable arrangement of the support means can be designed in various ways. For example the support means can be displaceably arranged between the top runs of the face and gate conveyors so that it can be shifted from the stowage position into the working position in which it is located substantially at the level of the conveying floor or tray of the face conveyor and bridges over the tray opening thereof. However, the adjustable support means is preferably pivotable and is mounted such that it can be pivoted from the stowage position into the set out position and vice versa.

It is advisable to use a narrow supporting plate as the adjustable support means.

In a preferred embodiment of the invention, the pivotal support is mounted in a pivot bearing which is formed, for example, by a pivot pin which is located on a side where the gate conveyor is connected to the box frame and laterally next to the top run of the gate conveyor but just above this top run so that the pivotal support can be pivoted from the stowage position in which it is located laterally next to the top run of the gate conveyor into the set out position in which it bridges over the tray opening of the face conveyor inside the box frame and can fulfil its function as a rest for the scraper-chain assembly of the face conveyor.

It is advisable to arrange the pivot bearing for the support on a connecting trough connecting the gate conveyor to the box frame more preferably on the exterior thereof say on an upright lateral wall. The lateral wall is preferably provided with a slot or the like which receives the pivotal support in the stowage position so that the pivotal support is protected and concealed in the slot in its stowage position. The pivotal support may have a length which is such that it can rest with its free end remote from the pivot bearing in the set out position inside the supporting frame on the lateral wall of the gate conveyor wall.

It is also advisable to form the support or the pivotal mounting such that the support can be locked in the stowage or set positions, and preferably in both positions. This can be brought about with a simple bolt-type lock which is preferably arranged at the pivot bearing end of the pivotal support between the pivotal support and the upright lateral wall of the trough.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
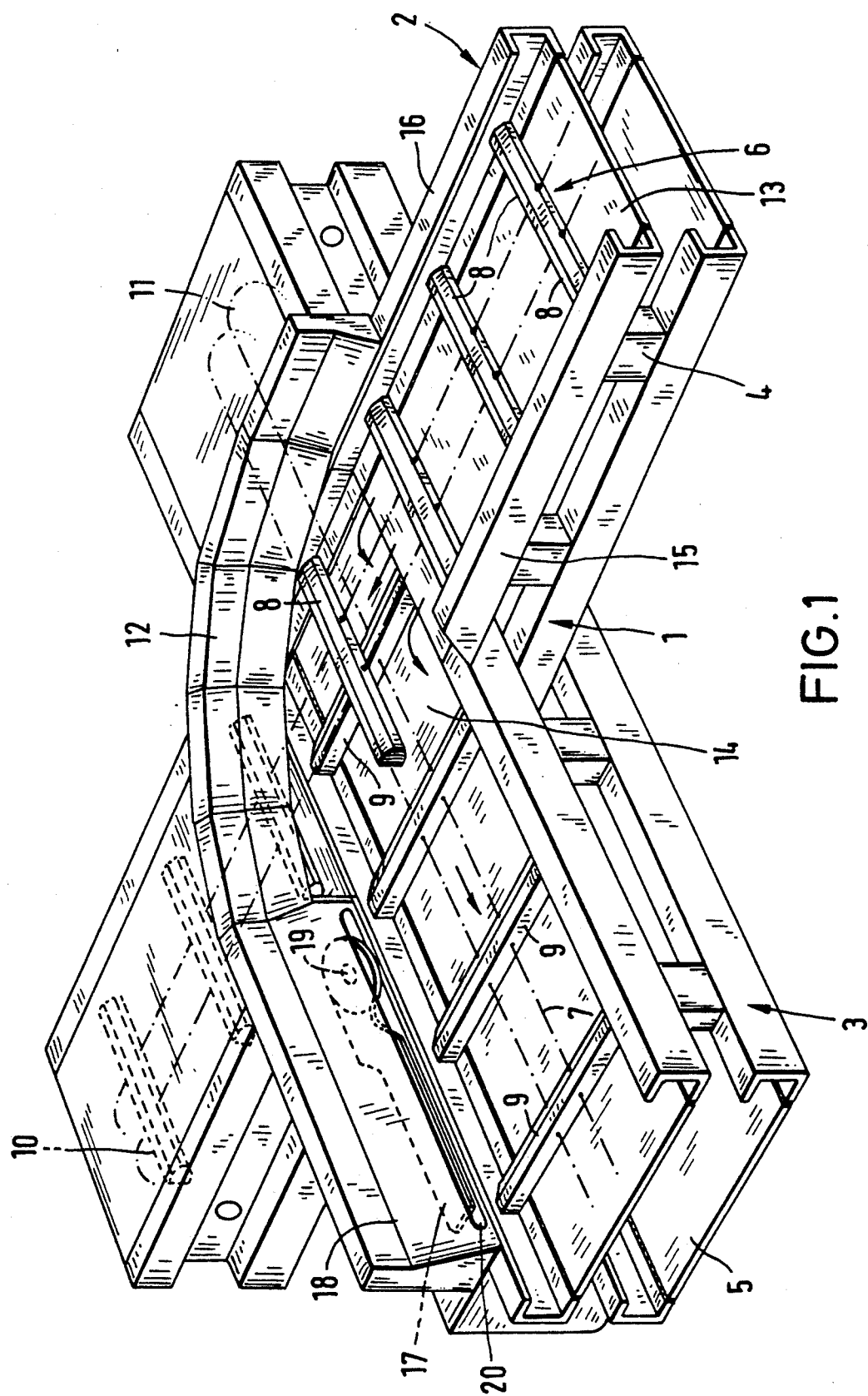
FIG. 1 is a schematic simplified perspective view of a transfer station constructed in accordance with the invention.

The transfer station illustrated in the drawings servers for the transfer of material from a mine working, such as longwall face, to a gate or roadway in the underground mine. The station has a box frame 1 which supports troughs or pans of a scraper-chain face conveyor 2 and of a scraper-chain roadway or gate conveyor 3 extending at right angles thereto, preferably via connecting pans 4 and 5. The face conveyor 2 and the gate conveyor 3 preferably consist of in-board or centre-chain scraper-chain conveyors, e.g. a double centre chain scraper conveyor as illustrated. The box frame 1 defines the intersection for the two scraper-chain conveyors 2 and 3. Conveniently the endmost conveyor troughs of the face gate conveyor 2, 3 are detachably connected to the connecting troughs 4 and 5, for example by a screw connection.

The basic design of the transfer station with the box frame 1 is known. It is preferably of a construction which is known from U.S. Pat. No. 4,673,079,3079 herein incorporated by reference.

The two scraper-chain assemblies 6 and 7 of the face and gate conveyors 2, 3 are indicated only schematically with the scrapers 8 and 9 in the drawings. The conveying direction for the face coveyor 2 and the gate coveyor 3 is indicaterd by arrows. The scraper chain assembly 6 of the face coveyor 2 is deflected from the top run into the closed bottom run at the box frame 1 via a driving or reversing drum 10. When the face conveyor 2 is reversed the assembly 6 runs from the bottom over the drum 10 into the top run. The scraper chain assembly 7 of the gate conveyor 3 moving material at right angles to the face conveyor 2 is likewise deflected at the box frame 1 via a drive or reversing drum 11 from the closed bottom run into the top run of the gate conveyor 3. The top run of the gate coveyor 3 extends between the top run and the bottom run of the face coveyor 2 inside the box frame 1. The bottom run of the face conveyor 2 extends between the top run and the bottom run of the gater conveyor 3 in the box frame 1. Above the top run of the face conveyor 2 there is arranged in a known manner a fender 12 which discharges coarse material, for example thick pieces of coal, in particular, during the winning of coal, from the top run of the face conveyor 2 into the top run of the gate conveyor 3 during the normal conveying operation. The scraper-chain assembly 6 of the face coveyor 2 runs through beneath the fender 12 in the top run of the face conveyor 2 in the region of the box frame 1. The conveying floor or tray 13 on which the material is conveyed by the scraper-chain assembly 6 in the top run of the face conveyor 2 is interrupted in the region of the box frame 1, producing an opening 14 substantially over the full width of the conveyor trough. The material conveyed by the scraper chain assembly 6 thererfore falls through the opening 14 in the tray 13 onto the top run of the gate conveyer 3 in the region of the box frame 1 so that it is discharged together with the coarse pieces, deflected by the fender 12, in the top run of the gate conveyer 3 in the direction of the arrow indicated. Any "fines" (i.e. fine coal or the like) which adhere to the scraper-chain assembly 6 and do not fall via the opening 14 in the tray 13 into the top run of the gate conveyor 3 are conveyed back by the scraper-chain assembly 6 via its reversing or driving drum 10 into the bottom run of the face conveyor 2 and from here to the box frame 1 so that it falls within the box frame 1 through an opening in the base of the bottom run of the face conveyor 2 into the bottom run of the gate conveyor and is therefore taken upwardly back to the top run of the conveyor 3 via the reversing drum 11.

The leteral wall 15 of the conveyor 2 serving to guide the scrapers 8 to removed in the top run of the face conveyor 2 in the region of the opening 14 in the tray 13 so that the scrapers 8 are guided in the passage through the box frame 1 only on the other lateral wall 16.

Figure 2:
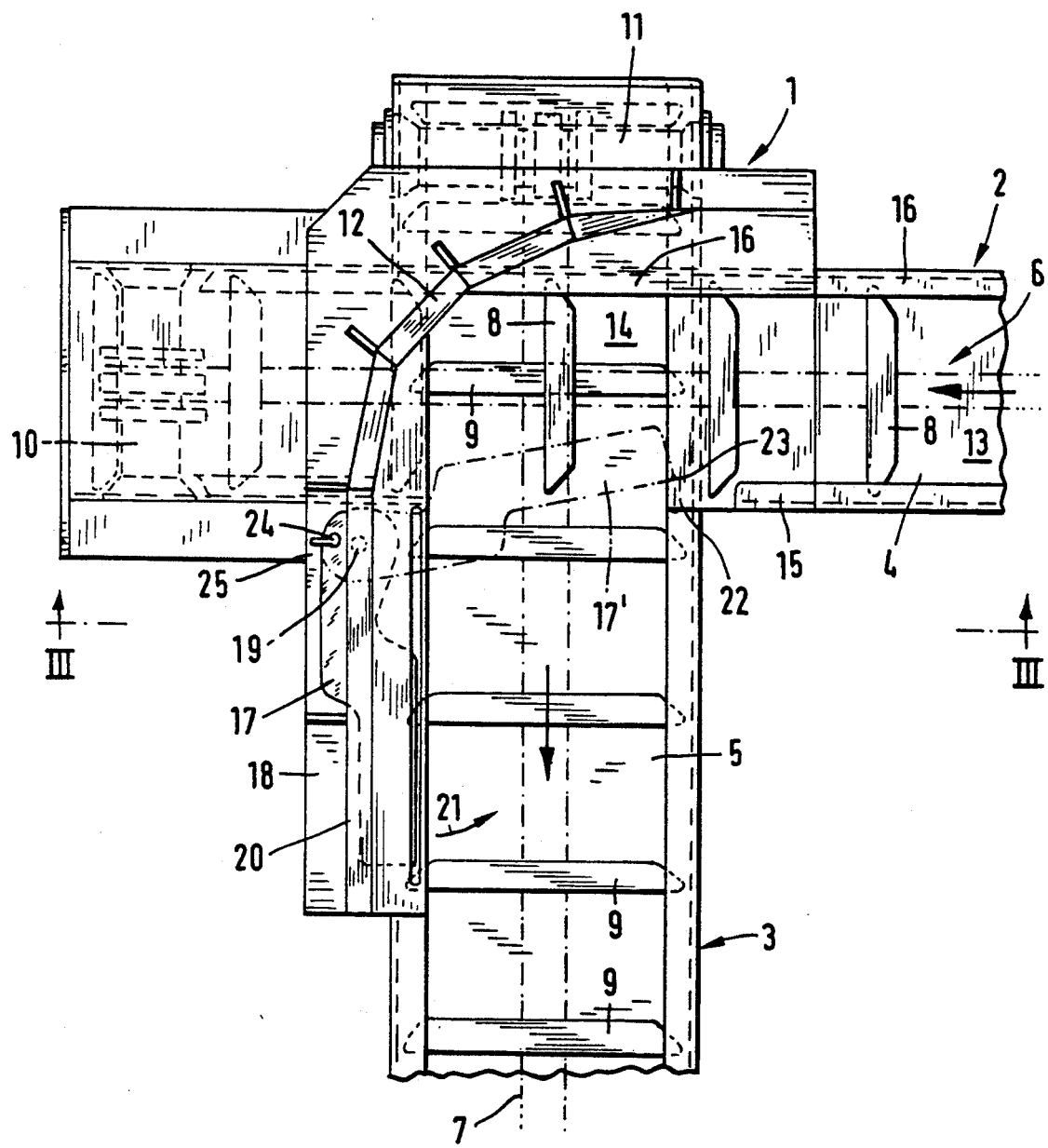
FIG. 2 is a plan view of the transfer station.

Transfer stations of the type described hereinbefore are already dnown from U.S. Pat. No. 4,673,079 as mentioned. During the normal conveying operation, the scraper-chain assemblies 6 and 7 of the face conveyor 2 and of the gate conveyor 3 are tensioned in the conveying top run so that these assemblies cannot collide in the region of intersection i.e. when the opening 14 in the tray 13 is being passed over. During the return of the scraper-chain assembly 6 of the face conveyor 2, however, slack chain can be formed in the top run thereof in the box frame 1 with the result that the scraper-chain assembly 6 can collide in the top run of the face conveyor 2 in the region of the opening 14 in the tray at the point of intersection, with the scraper-chain assembly 7 running in the top run of the gate conveyor 3. To avoid such colisions during the return run of the scraper-chain assembly 6 of the face conveyor 2, a support means in the form of a pivotal support 17 is arranged on the transfer station. The support 17 is pivotable from a stowage position which is ineffective for supporting the scraper-chain assembly 6 into a set out position in which it supports the scraper chain assembly 6 ruńning in the top run of the face conveyor 2 inside the box frame 1 above the opening 14 in the tray. The pivotal support 17 consists of a narrow supporting plate or a sword-like plate. As shown, in particular, in FIGS. 1 and 2, an upright lateral wall 18 is arranged, say as a spill plate, on the exterior of the connecting trough 5 of the gate conveyor 3 connected to the box frame 1. The pivotals support 17 is then pivotally mounted on the wall 18 directly above the top run of the gate conveyor 3 in a pivot bearing 19 in a horizontal plane coinciding substantially with the plane of the conveying tray 13 of the face conveyor 2. The pivot bearing 19 consists of a simple pin-type hinge with a vertical hinge pin. The lateral wall 18 has a slot 20 which receives the plate-shaped pivotal support 17 in the stowage position. The pivotal support 17 can be consequently pivoted into the upright lateral wall 18 in the stowage position so that it does not project into the top run of the gate conveyor 3 in an undesirable manner. FIGS. 1 and 2 show the pivotal support 17 in the stowage position in which it is located inside the slot 20. From this stowage position, the support 17 can be pivoted in the direction of the arrow 21 into the set out position which is indicated by dot dash lines at 17' in FIG. 2. In this set out position, the support 17 bridges over the opening 14 in the tray 13 at the region where the lateral wall 15 in the box frame 1 is removed.

Figure 3:
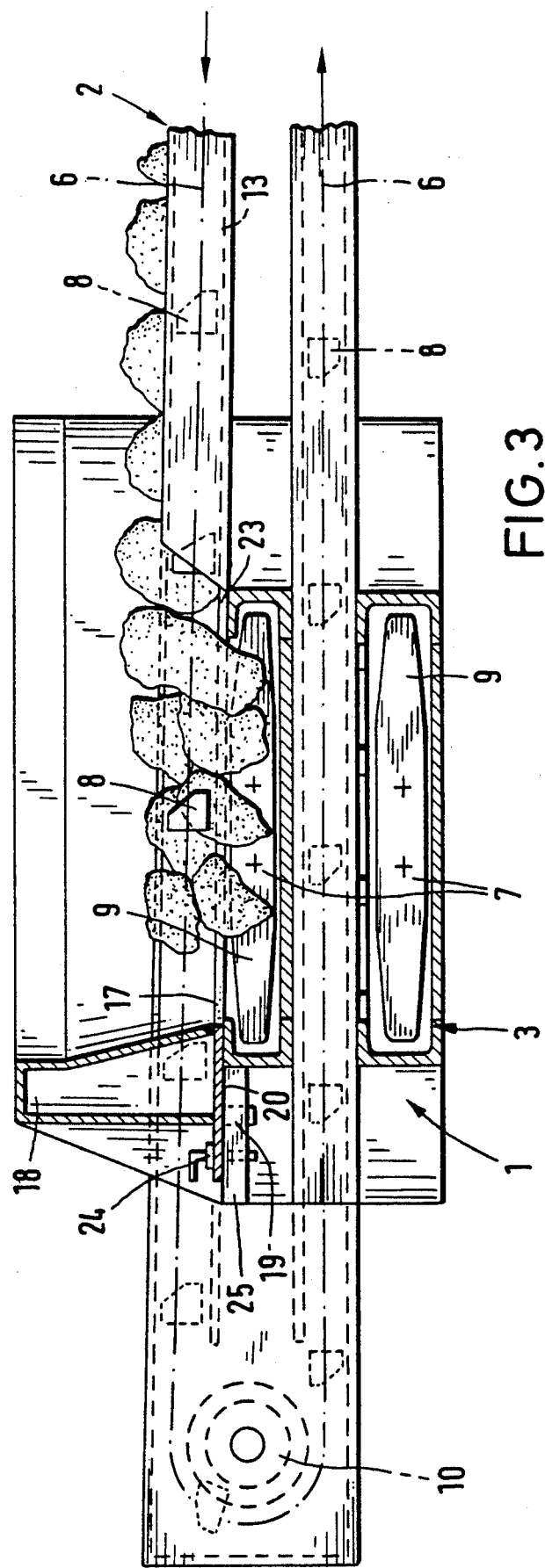
FIG. 3 is a sectional end view taken along the line III—III of FIG. 2.

As shown in FIGS. 2 and 3, the support 17 is of such a length that, in the set out position, it can rest with its free end remote from the pivot bearing 19 on the lateral wall 22 serving for scraper guidance of the scraper chain assembly 7 within the box frame 1 at 23. The scraper 8 of the scraper-chain assembly 6 consequently rest reliably on the pivoted out support 17 when the opening 14 in the tray 13 of the box frame 1 is passed over particularly at the ends remote from the outer scraper guide wall 16 so that the scraper-chain assembly 6 cannot collide with the scraper-chain assembly 7 running below it even if there is slack chain in the top run of the face conveyor 2.

The support 17, consisting of the sword-like plate, can be locked in its stowage position and also in its set out position. This can be carried out by means of a locking bolt 24 which is arranged in the region of the pivot bearing 19. In order to lock the support 17 in the stowage position, the locking bolt 24 is inserted from above into aligned holes in the support 17 and a strip 25 in the lateral wall 18. When the locking bolt 24 is released, the support 17 can be pivoted in the direction of the arrow 21 into the set out position 17' and can be locked again in this position. This is carried out when the locking bolt 24 is inserted into a second hole of the support 17 and another hole in the strip 25. The support 17 is generally pivoted by han but can optionally also be pivoted by means of a pivoting drive.

During the normal conveying operation, the support 17 is generally located in the stowage position inside the slot 20 in the lateral wall 18. It is generally necessary to pivot the support 17 into the working position 17' only during the return travel of the face conveyor 2.

We claim:

1. Transfer station for the transfer of material from a longwall face to a gate or roadway in an underground mine; said station comprising at least part of a scraper-chain face conveyor for transferring material along the longwall face, at least part of a scraper-chain gate conveyor for taking material from the face conveyor and transferring the material away from the longwall face, a box frame in which a top run of the gate conveyor is arranged between a top run and a bottom run of the face conveyor, an opening in the face conveyor between the top run of the face conveyor and the top run of the gate conveyor, support means locatable beneath a scraper-chain assembly of the face conveyor in the region of the opening to support the assembly and means for mounting the support means for adjustment from a stowage position which is ineffective for supporting the scraper-chain assembly into an operative position for supporting the scraper-chain assembly and vice versa.

2. A transfer station according to claim 1, wherein the mounting means mounts the adjustable support means for pivoting between the stowage and operative positions.

3. A transfer station according to claim 1, wherein the adjustable support means is in the form of a plate.

4. A transfer station according to claim 2 wherein the mounting means is a pivot bearing located where the gate conveyor is connected to the box frame and laterally next to the top run of the gate conveyor.

5. A transfer station according to claim 4, wherein there is a connecting trough for connecting the gate conveyor to the box frame and the pivot bearing is provided on an upright lateral wall of the connecting trough.

6. A transfer station according to claim 5, wherein the lateral wall is provided with a slot for receiving the support means in the stowage position.

7. A transfer station according to claim 2 wherein the support means is of such a length that it is supported with its free end remote from the mounting means in the operative position on a lateral wall of the gate conveyor.

8. A transfer station according to claim 1, wherein locking means is provided for fixing the support means in the stowage and/or operative positions.

9. A transfer station according to claim 5 and further comprising a locking pin located at the pivot bearing end of the support means between the support means and the upright lateral wall for securing the support means in one or other of its positions.

* * * * *